(12) United States Patent
McAuley

(10) Patent No.: US 10,673,301 B1
(45) Date of Patent: Jun. 2, 2020

(54) SHUTTER ACTUATION

(71) Applicant: N2 Imaging Systems, LLC, Irvine, CA (US)

(72) Inventor: Daniel E. McAuley, Irvine, CA (US)

(73) Assignee: N2 Imaging Systems, LLC, Irvine, CA (US)

( * ) Notice: Subject to any disclaimer, the term of this patent is extended or adjusted under 35 U.S.C. 154(b) by 0 days.

(21) Appl. No.: 16/271,151

(22) Filed: Feb. 8, 2019

(51) Int. Cl.
*H04N 5/225* (2006.01)
*H02K 5/24* (2006.01)
*G03B 9/10* (2006.01)
*H02K 7/06* (2006.01)
*G10K 11/16* (2006.01)

(52) U.S. Cl.
CPC .............. *H02K 5/24* (2013.01); *G03B 9/10* (2013.01); *H02K 7/06* (2013.01); *H04N 5/2254* (2013.01); *G10K 11/16* (2013.01)

(58) Field of Classification Search
CPC ............................ H02K 5/24; H04N 5/2254
USPC ........................................................ 348/374
See application file for complete search history.

(56) References Cited

U.S. PATENT DOCUMENTS 4,183,646 A * 1/1980 Tsunefuji ................. G03B 9/14
396/201
2015/0375865 A1* 12/2015 Fischer ................... B60N 2/919
701/49

* cited by examiner

*Primary Examiner* — Joel W Fosselman
(74) *Attorney, Agent, or Firm* — Knobbe, Martens, Olson & Bear, LLP

(57) ABSTRACT

An imaging device includes a frame. An imaging sensor is seated in the frame. A shutter is pivotally mounted to the frame along a pivot axis. The shutter is positioned to pivot between a first position that is clear of the imaging sensor and a second position that occludes the imaging sensor. A linear actuator is pivotally connected to the shutter at a linkage axis that is offset from the pivot axis for actuating the shutter between the first and second positions.

14 Claims, 2 Drawing Sheets

SHUTTER ACTUATION

BACKGROUND OF THE INVENTION

1. Field of the Invention

The present disclosure relates to imaging systems, and more particularly to shutter actuation for imaging systems.

2. Description of Related Art

Imaging systems such as cameras utilize shutters to cover over the imaging sensor. In infrared imaging systems, calibration shutters are used to recalibrate the imaging sensor. In this context, a shutter covers the sensor and the sensor images the shutter. The shutter can be temperature controlled, or a sensor can be used to determine the temperature of the shutter. Using the known temperature of the calibration shutter allows the system to recalibrate the imaging sensor. If this is done periodically, the imaging sensor can stay well calibrated. One drawback to shutter actuation is that the shutter can generate audible noise as it is actuated. In sound sensitive applications, the actuation noise of a calibration shutter can be a disadvantage.

The conventional techniques have been considered satisfactory for their intended purpose. However, there is an ever present need for improved shutter calibration. This disclosure provides a solution for this need.

SUMMARY OF THE INVENTION

An imaging device includes a frame. An imaging sensor is seated in the frame. A shutter is pivotally mounted to the frame along a pivot axis. The shutter is positioned to pivot between a first position that is clear of the imaging sensor and a second position that occludes the imaging sensor. A linear actuator is pivotally connected to the shutter at a linkage axis that is offset from the pivot axis for actuating the shutter between the first and second positions.

The imaging sensor can be aligned normal to an optical axis that is parallel to the pivot axis. The shutter can pivotally connect to the frame through a bearing. The linear actuator can include a rotary motor that is spaced apart from a flag portion of the shutter through at least one link of a linkage.

The linear actuator can include a rotary motor mounted to the frame. The rotary motor can be operatively connected to a lead screw threaded to a nut that is mounted a fixed distance from the linkage axis. The rotary motor can be a stepper motor. The rotary motor can be pivotally mounted to an arm along a mounting axis offset from the pivot axis and the linkage axis. The arm can be mounted in a fixed position relative to the frame. The rotary motor can include a rotating shaft coupled to the lead screw. The shaft and the lead screw can be configured to rotate about a drive axis that is angled orthogonal to and is offset from the pivot axis. The nut can be an anti-backlash nut configured to maintain at least one of a state of tension or compression relative to the lead screw. The nut can be mounted in a link that is pivotally mounted to the shutter at the linkage axis. The shutter can include a flag portion configured to occlude the imaging sensor. The link can connect to a leg of the shutter between the flag portion and the pivot axis.

A method of shutter actuation includes actuating a shutter including a flag portion configured to occlude an imaging sensor, wherein a rotary motor drives actuation of the shutter. The method includes attenuating sound between the rotary motor to the flag portion through a linear actuator linkage. Actuating can include rotating the shutter about a pivot axis by rotating the rotary motor about a drive axis that is orthogonal to and is offset from the pivot axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
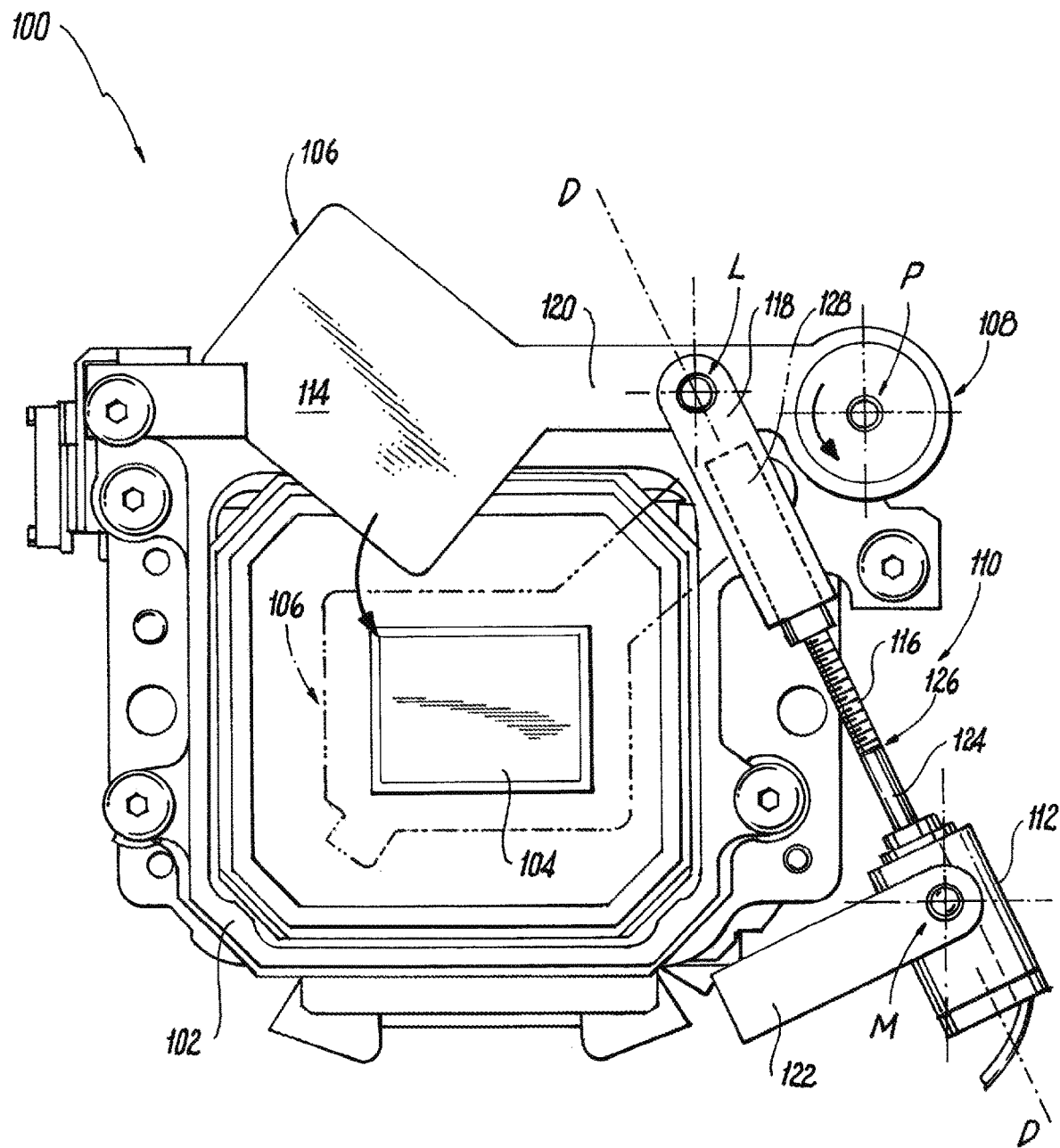
FIG. 1 is a plan view of an exemplary embodiment of a imaging device constructed in accordance with the present disclosure, showing the shutter and imaging sensor.

Reference will now be made to the drawings wherein like reference numerals identify similar structural features or aspects of the subject disclosure. For purposes of explanation and illustration, and not limitation, a partial view of an exemplary embodiment of an imaging device in accordance with the disclosure is shown in FIG. 1 and is designated generally by reference character 100. Other embodiments of imaging devices in accordance with the disclosure, or aspects thereof, are provided in FIG. 2, as will be described. The systems and methods described herein can be used for shutter actuation, e.g., for calibration shutters in infrared imaging devices such as infrared goggles.

The imaging device 100 includes a frame 102. An imaging sensor 104 is seated in the frame 102. A shutter 106 is pivotally mounted to the frame 102 by a bearing 108, e.g., a simple bearing using polytetrafluoroethylene (PTFE), that rotates along a pivot axis P. The shutter 106 is positioned to pivot between a first position that is clear of the imaging sensor 104, shown in solid lines in FIG. 1, and a second position (schematically indicated in FIG. 1 with broken lines) that occludes the imaging sensor 104, e.g., for calibrating the imaging sensor using a known temperature of the flag portion 114. A linear actuator 110 is pivotally connected to the shutter 106 at a linkage axis L that is offset from the pivot axis P for actuating the shutter 106 between the first and second positions. The imaging sensor 104 is aligned normal to an optical axis O, labeled in FIG. 2, that is parallel to the pivot axis P.

The linear actuator 110 includes a rotary motor 112 that is spaced apart from a flag portion 114 of the shutter 106 through a linkage that includes a lead screw 116 and a link 118. The link 118 pivotally connects to a leg 120 of the shutter 106 at the linkage axis L that is between the flag portion 114 and the pivot axis P, however those skilled in the art will readily appreciate that the link 118 can connect to a projection off of the leg 120 on the other side of the pivot axis P.

Figure 2:
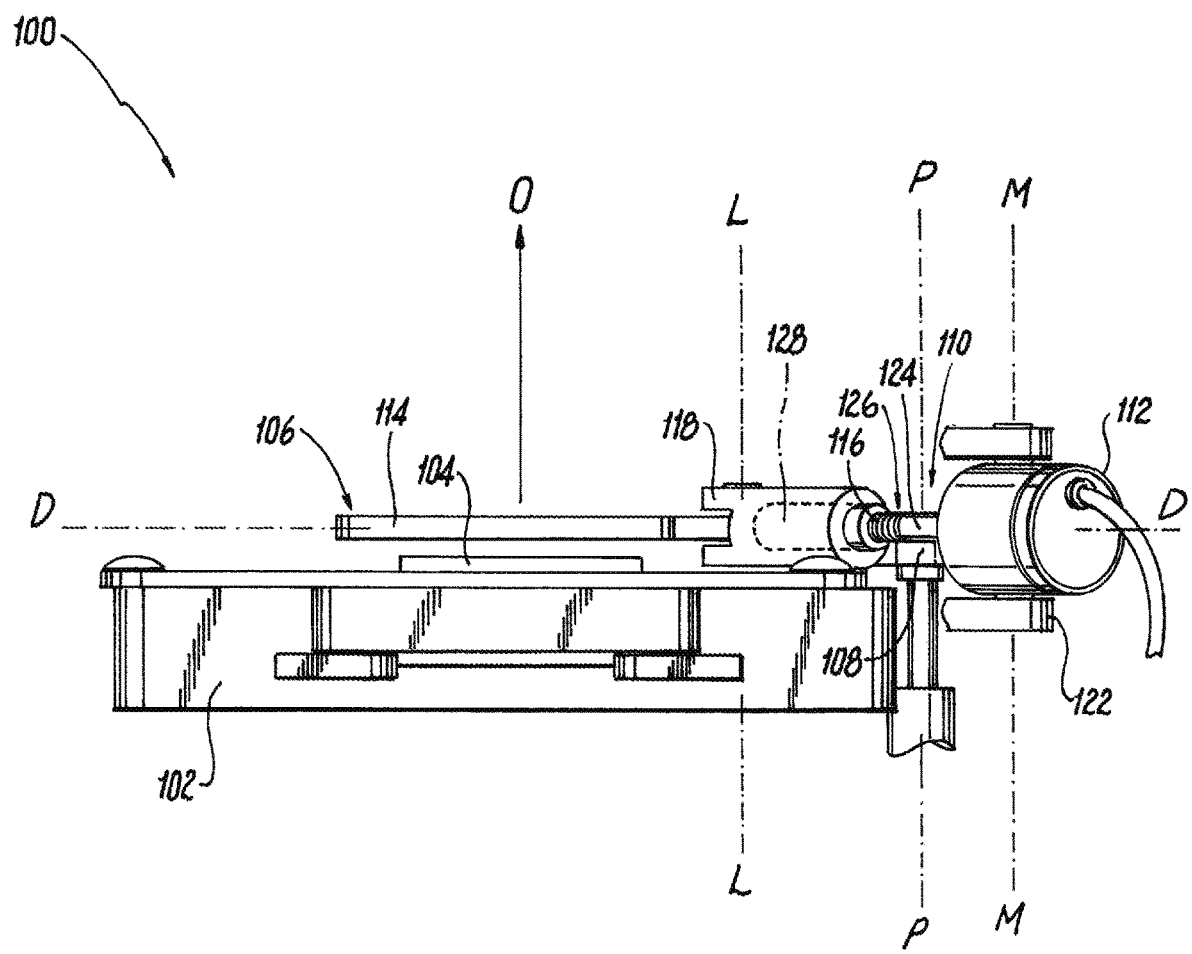
FIG. 2 is a schematic side elevation view of the imaging device of FIG. 1, showing the axes of the linear actuator.

The rotary motor 112 is pivotally mounted to an arm 122 along a mounting axis M that is offset from the pivot axis P and the linkage axis L. The arm 122 is mounted in a fixed position relative to the frame 102. The rotary motor 112 can be a stepper motor that can be controlled to drive its shaft 124 clockwise and counterclockwise. The rotating shaft 124 of the rotary motor 112 is operatively connected by a shaft coupling 126 to the lead screw 116. The lead screw 116 is threaded to a nut 128 that is mounted a fixed distance from the linkage axis L, i.e., the nut 128 is mounted fixed in place within the link 118, i.e., to prevent the nut 128 from spinning when the lead screw 116 spins. The shaft 124 and the lead screw 116 are configured to rotate about a drive axis D that is angled orthogonal to the pivot axis P (as can be seen in FIG. 2) and is offset from the pivot axis P (as can be seen in FIG. 1). Due to the threading engagement of the nut 128 and the lead screw 116, rotating the rotary motor 112 one way (clockwise or counterclockwise) shortens the linkage distance between the axes L and M and moves the flag portion 114 from the first position to the second position, and rotating the rotary motor 112 the other direction (clockwise or counterclockwise) lengthens the linkage distance between axes L and M and moves the flag portion 114 from the second position to the first position. The nut 128 is an anti-backlash nut configured to maintain at least one of a state of tension or compression relative to the lead screw 116 so there is little or no play between the lead screw 116 and the nut 128 for reduction of vibrations and audible noise from the linear actuator 110.

A method of shutter actuation includes actuating a shutter (e.g. shutter 106), including a flag portion (e.g., flag portion 114) configured to occlude an imaging sensor (e.g., imaging sensor 104), wherein a rotary motor (e.g., rotary motor 112) drives actuation of the shutter. The method includes attenuating sound between the rotary motor to the flag portion through a linear actuator linkage (e.g., the linkage of actuator 110). Actuating includes rotating the shutter about a pivot axis (e.g., pivot axis P) by rotating the rotary motor about a drive axis (e.g., drive axis D) that is orthogonal to and is offset from the pivot axis.

Potential benefits using systems and methods disclosed herein relative to traditional systems and techniques include less vibration created from the shutter drive system, reduced vibration migrating out beyond the shutter (which can prevent resonating, e.g., in a goggle case), without backlash the flag position is controlled more accurately, reduced cost, and PTFE bearings in the pivoting joints can further attenuate audible noise.

The methods and systems of the present disclosure, as described above and shown in the drawings, provide for shutter actuation with superior properties including improved audible noise characteristics relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. An imaging device comprising:
a frame;
an imaging sensor seated in the frame;
a shutter pivotally mounted to the frame along a pivot axis, wherein the shutter is positioned to pivot between a first position that is clear of the imaging sensor and a second position that occludes the imaging sensor; and
a linear actuator pivotally connected to the shutter at a linkage axis that is offset from the pivot axis for actuating the shutter between the first and second positions.

2. The imaging device as recited in claim 1, wherein the linear actuator includes a rotary motor mounted to the frame wherein the rotary motor is operatively connected to a lead screw threaded to a nut that is mounted a fixed distance from the linkage axis.

3. The imaging device as recited in claim 2, wherein the rotary motor is pivotally mounted to an arm along a mounting axis offset from the pivot axis and the linkage axis.

4. The imaging device as recited in claim 3, wherein the arm is mounted in a fixed position relative to the frame.

5. The imaging device as recited in claim 2, wherein the rotary motor includes a rotating shaft coupled to the lead screw, wherein the shaft and the lead screw are configured to rotate about a drive axis that is angled orthogonal to and is offset from the pivot axis.

6. The imaging device as recited in claim 2, wherein the nut is an anti-backlash nut configured to maintain at least one of a state of tension or compression relative to the lead screw.

7. The imaging device as recited in claim 2, wherein the nut is mounted in a link that is pivotally mounted to the shutter at the linkage axis.

8. The imaging device as recited in claim 7, wherein the shutter includes a flag portion configured to occlude the imaging sensor, wherein the link connects to a leg of the shutter between the flag portion and the pivot axis.

9. The imaging device as recited in claim 2, wherein the rotary motor is a stepper motor.

10. The imaging device as recited in claim 1, wherein the imaging sensor is aligned normal to an optical axis that is parallel to the pivot axis.

11. The imaging device as recited in claim 1, wherein the shutter pivotally connects to the frame through a bearing.

12. The imaging device as recited in claim 1, wherein the linear actuator includes a rotary motor that is spaced apart from a flag portion of the shutter through at least one link of a linkage.

13. A method of shutter actuation comprising:
actuating a shutter including a flag portion configured to occlude an imaging sensor, wherein a rotary motor drives actuation of the shutter; and
attenuating sound between the rotary motor to the flag portion through a linear actuator linkage.

14. The method as recited in claim 13, wherein actuating includes rotating the shutter about a pivot axis by rotating the rotary motor about a drive axis that is orthogonal to and is offset from the pivot axis.

* * * * *